United States Patent
Kumamoto

(10) Patent No.: US 7,599,816 B2
(45) Date of Patent: Oct. 6, 2009

(54) MAINTENANCE-INFORMATION PROVIDING SYSTEM

(75) Inventor: Gen Kumamoto, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 943 days.

(21) Appl. No.: 10/547,380

(22) PCT Filed: Mar. 2, 2004

(86) PCT No.: PCT/JP2004/002580

§ 371 (c)(1),
(2), (4) Date: Aug. 29, 2005

(87) PCT Pub. No.: WO2004/079615

PCT Pub. Date: Sep. 16, 2004

(65) Prior Publication Data

US 2006/0259832 A1 Nov. 16, 2006

(30) Foreign Application Priority Data

Mar. 3, 2003 (JP) .............................. 2003-055097

(51) Int. Cl.
G06F 11/00 (2006.01)
G21C 17/00 (2006.01)

(52) U.S. Cl. .................................................... 702/184

(58) Field of Classification Search ................ 702/184, 702/58, 59, 179, 181–183, 185, 189; 714/25, 714/47; 324/500, 510–512; 700/108–110; 707/1, 3

See application file for complete search history.

(56) References Cited

U.S. PATENT DOCUMENTS

| | | | |
|---|---|---|---|
| 5,210,704 A | 5/1993 | Husseiny | |
| 5,245,554 A * | 9/1993 | Tsuyama et al. | 702/185 |
| 5,412,753 A | 5/1995 | Alston et al. | |
| 5,566,092 A | 10/1996 | Wang et al. | |
| 5,596,507 A | 1/1997 | Jones et al. | |
| 5,808,903 A | 9/1998 | Schiltz et al. | |
| 6,336,065 B1 * | 1/2002 | Gibson et al. | 701/29 |
| 6,626,366 B2 * | 9/2003 | Kayahara et al. | 236/94 |
| 7,065,570 B2 | 6/2006 | Fukushima et al. | |
| 7,516,025 B1 * | 4/2009 | Williams et al. | 702/57 |
| 2002/0184178 A1 | 12/2002 | Tasooji et al. | |

(Continued)

FOREIGN PATENT DOCUMENTS

CN 1342875 A 4/2002

(Continued)

Primary Examiner—Michael P. Nghiem
Assistant Examiner—Cindy H Khuu
(74) Attorney, Agent, or Firm—Global IP Counselors

(57) ABSTRACT

A maintenance-information providing system is configured to provide information to maintain an air conditioner more appropriately. The system has an actual trouble code data storage section which stores data based on a trouble code, an actual predictive trouble code data storage section which stores data based on a predictive trouble code, a code-correspondence data storage section which stores a trouble code corresponding to a predictive trouble code and a maintenance-portion-information outputting section. The maintenance-portion-information outputting section extracts a trouble portion of the air conditioner corresponding to the predictive trouble code based on the data of the actual trouble code data storage section and the actual predictive trouble code data storage section. At the same time, the trouble code corresponding to the predictive trouble code is extracted and then a trouble portion of the air conditioner corresponding to the trouble code is extracted.

9 Claims, 13 Drawing Sheets

U.S. PATENT DOCUMENTS

2003/0065679 A1* 4/2003 Hirayama .................. 707/104.1
2003/0114994 A1* 6/2003 Wada ........................... 702/33

FOREIGN PATENT DOCUMENTS

| EP | 0 546 882 A1 | 6/1993 |
| EP | 1 020 815 A2 | 7/2000 |
| EP | 1 172 717 A | 8/2003 |
| JP | 6-294668 A | 10/1994 |
| JP | 2001-282944 A | 10/2001 |
| JP | 2001-304667 A | 10/2001 |
| JP | 2001-331350 A | 11/2001 |
| JP | 2002-283190 A | 10/2002 |
| KR | 2002-0006003 A | 1/2002 |

* cited by examiner

Trouble portion under trouble code 1 and
certainty degree of trouble (Total = 50)

| Trouble portion | Total number of troubles | Certainty degree of trouble |
|---|---|---|
| Electric valve | 20 | 20/50 |
| Compressor | 20 | 20/50 |
| Heat exchanger | 10 | 10/50 |

*Fig. 4(A)*

Extracted pieces of data under predictive trouble code A

I: The number of pieces of data is insufficient (Total = 20)

| Trouble portion | Total number of troubles | Predictive certainty degree |
|---|---|---|
| Heat exchanger | 10 | 10/20 |
| Electric valve | 6 | 6/20 |
| Compressor | 4 | 4/20 |

II: The number of pieces of data is relatively sufficient (Total = 50)

| Trouble portion | Total number of troubles | Predictive certainty degree |
|---|---|---|
| Electric valve | 20 | 20/50 |
| Compressor | 20 | 20/50 |
| Heat exchanger | 10 | 10/50 |

III: The number of pieces of data is sufficient (Total = 100)

| Trouble portion | Total number of troubles | Predictive certainty degree |
|---|---|---|
| Compressor | 60 | 60/100 |
| Electric valve | 30 | 30/100 |
| Heat exchanger | 10 | 10/50 |

Fig. 4(B)

Extraction of trouble code corresponding to predictive trouble code A

I: Trouble portion under trouble code 1 and certainty degree of trouble (Total = 50)

| Trouble portion | Total number of troubles | Certainty degree of trouble |
|---|---|---|
| Electric valve | 20 | 20/50 |
| Compressor | 20 | 20/50 |
| Heat exchanger | 10 | 10/50 |

II: Trouble portion under trouble code 2 and certainty degree of trouble (Total = 10)

| Trouble portion | Total number of troubles | Certainty degree of trouble |
|---|---|---|
| Electromagnetic valve | 7 | 7/10 |
| Electric valve | 2 | 2/10 |
| Refrigerant | 1 | 1/10 |

*Fig. 4(C)*

Calculation of certainty degree of trouble

Weight coefficients of trouble codes 1 and 2 are 1:2

| Trouble portion | Total number of troubles | Certainty degree of trouble |
|---|---|---|
| Electromagnetic valve | 70 | 70/150 |
| Electric valve | 40 | 40/150 |
| Compressor | 20 | 20/150 |
| Heat exchanger | 10 | 10/150 |
| Refrigerant | 10 | 10/150 |

*Fig. 4(D)*

Calculation of certainty degree of trouble

No weight coefficients for trouble codes 1 and 2

| Trouble portion | Total number of troubles | Certainty degree of trouble |
|---|---|---|
| Electric valve | 22 | 22/60 |
| Compressor | 20 | 20/60 |
| Heat exchanger | 10 | 10/60 |
| Electromagnetic valve | 7 | 7/60 |
| Refrigerant | 1 | 1/60 |

Fig. 4(E)

Calculation of certainty degree of trouble

The total number of pieces of predictive trouble data is relatively sufficient

| Trouble portion | Total number of troubles | Certainty degree |
|---|---|---|
| Electric valve | 160 | 160/450 |
| Compressor | 140 | 140/450 |
| Electromagnetic valve | 70 | 70/450 |
| Heat exchanger | 70 | 70/450 |
| Refrigerant | 10 | 10/450 |

*Fig. 4(F)*

Calculation of certainty degree

The total number of pieces of predictive trouble data is insufficient

| Trouble portion | Total number of troubles | Certainty degree |
|---|---|---|
| Compressor | 70 | 70/170 |
| Electric valve | 46 | 46/170 |
| Electromagnetic valve | 24 | 24/170 |
| Heat exchanger | 20 | 20/170 |
| Refrigerant | 10 | 10/170 |

*Fig. 4(G)*

Transmitted information

| Field | Value |
|---|---|
| Administrative No. | 1512345678 |
| Transmission date and time | 2002/09/01 00:00:00 |
| Customer ID | 2099999999 |
| Customer's name | Daikin Industries, LTD. |
| Location | Shiga |
| Model name | ZEAS-AC |
| Operation time | 18765 |
| Business type information | Many stores/restaurant |
| SV information | none |

| Field | Value |
|---|---|
| Trouble code | E0 |
| Focused information | |
| Product information | BL: Multi for Building ▶ |
| Area information | ☐ valid |
| Operation time | ☑ valid |
| Business type information | ☐ valid |
| Compressor information | ☐ valid |
| Period for which DB is referred to | Past one year ▶ |
| | [Apply the focused condition] |

| Outputted information | | | | |
|---|---|---|---|---|
| Trouble level | A | | | |
| Request from SS | Please go within 90 minutes and finish repairing. | | | |
| Table of priorities | Priority | Presumed cause of trouble | Presumed portion to be maintained | Certainty degree | The number of cases |
| | 1 | Trouble in operation of compressor, trouble in start-up | Compressor | 40.0% | 58 |
| | 2 | Trouble in control P plate | Control P plate | 10.0% | 14 |
| | 3 | Wrong piping and fouling of air heat exchanger | Air heat exchanger | 8.0% | 11 |
| | 4 | Wrong operation in OC/opening and closing of electromagnetic valve | OC | 7.0% | 10 |
| | 5 | Too much filling of refrigerant | Refrigerant | 3.0% | 5 |
| | 6 | Trouble in electric valve | Electric valve | 3.0% | 5 |
| | 7 | Trouble in fan motor | Fan motor | 3.0% | 4 |
| | 8 | Wrong interconnection of coils of electromagnetic valve/electromagnetic valve | Coils of electric valve/electric valve | 2.0% | 4 |
| | 9 | Fouling of Air filter | Air filter | 1.0% | 3 |
| | 10 | Short-circuit | Location of outdoor unit | 1.0% | 2 |

[Output by FAX] [Expert checking] [Case-study-based checking] [Cancel]

MAINTENANCE-INFORMATION PROVIDING SYSTEM

CROSS-REFERENCE TO RELATED APPLICATIONS

This nonprovisional application claims priority under 35 U.S.C. §119(a) to Japanese Patent Application No. 2003-055097, filed in Japan on Mar. 3, 2003, the entire contents of which are hereby incorporated by reference.

FIELD OF THE INVENTION

The present invention relates to a maintenance-information providing system. More particularly, the present invention relates to a maintenance-information providing system for providing information for maintenance of installed apparatuses.

BACKGROUND ART

In an onsite repair service when some trouble has occurred in an apparatus such as an air conditioner, a service engineer (or service person) needs to visit a place where the apparatus is installed to find and repair the trouble portion. However, similar troubles sometimes occur in different portions of the apparatus. Therefore, if the service engineer has no information on the trouble of the apparatus when conducting an onsite repair service, it may take a lot of time to find where the trouble is. Or he may have to go back and get parts for repair, which he has not brought with him, and visit there again. This could be a great loss of time.

There are some ways of obtaining maintenance information on an apparatus which actually has some trouble. For example, the service engineer for conducting an onsite repair service on the apparatus can presume where the trouble is from his experience, based on the trouble code informed of by the apparatus. Or the service engineer can use the system disclosed in Japanese Patent Laid-open publication No. H06-294668. The system has database of the past trouble cases on the apparatus and provides maintenance information by presuming a new trouble in the apparatus from the similarity between the new one and the past case troubles.

SUMMARY OF THE INVENTION

In the case where a service engineer who conducts an onsite repair service on the apparatus presumes where the trouble is only from his experience, however, there is such a problem that the onsite-repair service engineer can not presume the trouble portion if he or she has never repaired any trouble portion of the apparatus similar to the apparatus to be repaired. Further, since the number of apparatuses for which a single service engineer can carry out maintenance work is limited, he or she can not have experience enough to presume where the trouble is. Furthermore, based on only experience, service engineers tend to identify the trouble portion roughly, so that they can not identify the precise trouble portion. In addition, relying on only experience of service engineers makes it difficult to have quantitative estimation because the estimation is based on the past experience and prejudice. This can lead to a biased decision on the trouble portion. As a result, it may take much time to identify the trouble portion of the apparatus.

The object of the present invention is to provide a system which can provide information that makes it possible to carry out maintenance of an apparatus more appropriately.

The maintenance-information providing system according to the first aspect of the invention provides maintenance information of an apparatus based on trouble data or predictive trouble data of the apparatus. The system comprises a storage section, a corresponding data storage section and a trouble-portion-extracting section. The storage section stores storage data based on the trouble data and the predictive trouble data. The corresponding data storage section stores the trouble data corresponding to the predictive trouble data. The trouble-portion-extracting section extracts a trouble portion of the apparatus corresponding to the predictive trouble data, based on the storage data in the storage section. The trouble-portion-extracting section also extracts the trouble data corresponding to the predictive trouble data from the corresponding data storage section and then extracts a trouble portion of the apparatus corresponding to the trouble data The word "trouble" means any trouble having occurred in the apparatus including break-down, malfunction or the like. When trouble occurred in the apparatus, a service engineer, for example, needs to visit the place and fix the apparatus. The trouble data indicates the apparatus has trouble. The predictive trouble data indicates the apparatus will have trouble if it is ignored and no maintenance is done. For the trouble data and predictive trouble data, it is possible to use symbols (codes) which are predetermined so as to be comprehensible to service engineers and so on. A service engineer should visit the place for maintenance before any trouble occurs in the apparatus, when the predictive trouble data is made.

The storage section stores storage data based on the trouble data and predictive trouble data. This stored data may include both trouble data and predictive trouble data as they are, or a tendency of trouble of the apparatus figured out from the trouble data and predictive trouble data. Or the stored data may also include, for example, an approximate equation which is figured out in advance so that a trouble portion can be identified from the trouble data and predictive trouble data.

The trouble-portion-extracting section extracts the trouble data which are related to the predictive trouble data from the apparatus by using the corresponding data storage section. Further, by using the storage section, the trouble-portion-extracting section outputs a trouble portion of the apparatus which corresponds to the predictive trouble data and the extracted trouble data. Here, the word "trouble portion" is used for an actual trouble portion or a trouble portion likely to occur in the future, which are found out at maintenance work of apparatus.

Here, the trouble-portion-extracting section extracts a trouble portion from the predictive trouble data by using the storage section and the corresponding data storage section. Therefore, it is possible to extract a trouble portion corresponding to the predictive trouble data based on the storage data. Also it becomes possible to extract a trouble portion related to the trouble data which correspond to the predictive trouble data in the corresponding data storage section. As a result, with this maintenance-information providing system, it is possible to obtain information for onsite maintenance of an apparatus by extracting a trouble portion from predictive trouble data of the apparatus. Therefore, it becomes possible to maintain the apparatus more appropriately.

In the maintenance-information providing system according to the second aspect of the invention, in addition to the first aspect of the invention, the storage section has an actual trouble data storage section and an actual predictive trouble data storage section. The actual trouble data storage section stores correspondence between the trouble data and the trouble portions of the apparatus in the past. The actual predictive trouble data storage section stores correspondence between the predictive trouble data and the trouble portions of the apparatus in the past.

Here, the storage section has an actual trouble data storage section and an actual predictive trouble data storage section.

When a service engineer visits to repair the apparatus after being informed of trouble data of the apparatus, the actual trouble data storage section stores the trouble portion of the apparatus which is identified in the repair and the corresponding trouble data which have caused the repair. Further, the actual predictive trouble data storage section stores the trouble portion and the predictive trouble data which have caused maintenance in such a manner that they correspond to each other, when a service engineer visits to maintain the apparatus after being informed of the predictive trouble data of the apparatus but before being informed of the trouble data of the apparatus in the past.

Further, those correspondences stored in the corresponding data storage section are the data of relations between the trouble data outputted when predictive trouble data have been informed of but the maintenance of the apparatus has not been done and the predictive trouble data. The data stored in the actual predictive trouble data storage section are limited to the data identified in the maintenance after the trouble is predicted. The data stored in the actual trouble data storage section on the other hand include those informed of as trouble data when predictive trouble data have been informed of but ignored.

Consequently, from the predictive trouble data, not only it is possible to output trouble portions including those stored in the actual predictive trouble data storage section, but also it is possible to output trouble portions including those related to the trouble data corresponding to the predictive trouble data in the corresponding data storage section, based on the actual trouble data storage section. Therefore, it is possible to provide a trouble portion extracted from the predictive trouble data of the apparatus based on the actual predictive trouble data storage section and the actual trouble data storage section.

In the maintenance-information providing system according to the third aspect of the invention, in addition to either one of the first or second aspect of the invention, the trouble-portion-extracting section is capable of extracting a trouble portion of the apparatus corresponding to the trouble data from the actual trouble data storage section.

Here, the trouble-portion-extracting section extracts a trouble portion of the apparatus based on the trouble data of the apparatus. Consequently, it is possible to provide information for appropriately conducting maintenance and repair with respect to the troubles having actually occurred in the apparatus.

In the maintenance-information providing system according to the fourth aspect of the invention, in addition to any one of the first through third aspects of the invention, the trouble-portion-extracting section is capable of outputting the extracted trouble portion as a maintenance portion.

Here, information on the extracted trouble portion can be outputted as a portion to be maintained. Since the extracted trouble portion considered as a maintenance portion can be a detailed piece of information for onsite maintenance, it is possible to maintain the apparatus more properly.

In the maintenance-information providing system according to the fifth aspect of the invention, in addition to any one of the first through fourth aspects of the invention, the trouble-portion-extracting section is capable of outputting information on an article required for the maintenance of the apparatus.

As an article required for maintenance, there is for example a checking tool which is needed for checking a trouble portion of the apparatus, a part for maintenance of a trouble portion of the apparatus or the like.

Here, information on an article required for onsite maintenance and repair is outputted at the same time when the trouble portion is outputted. Since the information on the trouble portion corresponding to a trouble and the article required for maintenance and repair can be outputted, it is possible to easily and reliably take care of the apparatus in a proper manner. Further, since service engineers can bring the articles required for maintenance and repair with them when they visit the place, they can check the trouble portions at the same time when they maintain and repair the trouble portions. Therefore, it is possible for service engineers to maintain and repair the apparatus quickly.

For example, when the apparatus is out of order, service engineers bring the outputted maintenance parts with them, so that they can check and repair the trouble portions at one time. As a result, the number of visits for repair of the apparatus can be reduced, which makes it possible to maintain and repair the apparatus quickly.

In the maintenance-information providing system according to the sixth aspect of the invention, in addition to any one of the first through fifth aspects of the invention, a plurality of trouble portions are extracted in the trouble-portion-extracting section. The system further comprises a certainty-degree calculating section which figures out a degree of certainty from each frequency of the trouble portions extracted from the actual predictive trouble data storage section and the actual trouble data storage section. Furthermore, the trouble-portion-extracting section outputs the trouble portions and the certainty degrees in descending order of the certainty degrees.

The certainty degree of the trouble data or predictive trouble data means a frequency of a trouble portion (maintenance portion) of the apparatus with respect to the trouble data or predictive trouble data stored in the storage section. Specifically, the certainty degree means a ratio of the number of trouble portions (maintenance portions) with respect to the number of pieces of trouble data or predictive trouble data stored in the storage section, or these numerical amount data.

Here, data on trouble portions and the corresponding certainty degrees are outputted in descending order of the certainty degrees. Therefore, it is possible to maintain and repair the apparatus based on the certainty degrees. Thus, it becomes possible to maintain and repair the apparatus more effectively.

The maintenance-information providing system according to the seventh aspect of the invention, in addition to any one of the first through sixth aspects of the invention, further comprises an input-receiving unit which receives inputs of the trouble data, the predictive trouble data and particulars of the apparatus. The particulars include a model number of the apparatus or the like. By the trouble-portion-extracting section, the trouble portion is limited to that of the apparatus which satisfies the particulars and is extracted from the storage section.

Here, the trouble-portion-extracting section outputs a trouble portion only from the data limited to the particulars (a model name, a product name of the apparatus and so on). As a result, since the trouble-portion-extracting section can extract a trouble portion in view of tendency of trouble portions which are peculiar to the apparatus having particular features, it becomes possible to provide more appropriate maintenance information for the apparatus.

In the maintenance-information providing system according to the eighth aspect of the invention, in addition to the seventh aspect of the invention, the particulars include an age of the apparatus or the like.

In this aspect of the invention, a trouble portion is limited according to time-based changes such as an age of the apparatus since the apparatus was set up and is then outputted by the trouble-portion-extracting section. Therefore, it is possible to take account of the tendency of the trouble portion growing by the age of the apparatus.

In the maintenance-information providing system according to the ninth aspect of the invention, in addition to either one of the seventh or eighth aspect of the invention, the particulars include a business type, an area and the similar information where the apparatus is located.

In this aspect of the invention, a trouble portion is limited according to the information on the places where the apparatus is located and the business type and is then outputted by the trouble-portion-extracting section. Consequently, it is possible to take account of the tendency according to the situation of use of the apparatus.

BRIEF DESCRIPTION OF DRAWINGS

FIG. 4(A) is a diagram showing relations between the trouble portions in the air conditioner and the certainty degrees of trouble.

FIG. 4(B) are diagrams showing relations between the trouble portions in the air conditioner and the certainty degrees of predictive trouble.

FIG. 4(C) are diagrams showing relations between the trouble portions in the air conditioner and the certainty degrees of trouble.

FIG. 4(D) is a diagram showing relations between the trouble portions in the air conditioner and the certainty degrees of trouble.

FIG. 4(E) is a diagram showing relations between the trouble portions in the air conditioner and the certainty degrees of trouble.

FIG. 4(F) is a diagram showing relations between the trouble portions in the air conditioner and the certainty degrees of trouble.

FIG. 4(G) is a diagram showing relations between the trouble portions in the air conditioner and the certainty degrees of trouble.

FIG. 5(A) is a diagram showing one example of (the upper half of) the maintenance information outputted to and displayed on the terminal.

FIG. 5(B) is a diagram showing one example of (the lower half of) the maintenance information outputted to and displayed on the terminal.

DETAILED DESCRIPTION OF THE PREFERRED EMBODIMENTS

Figure 1:
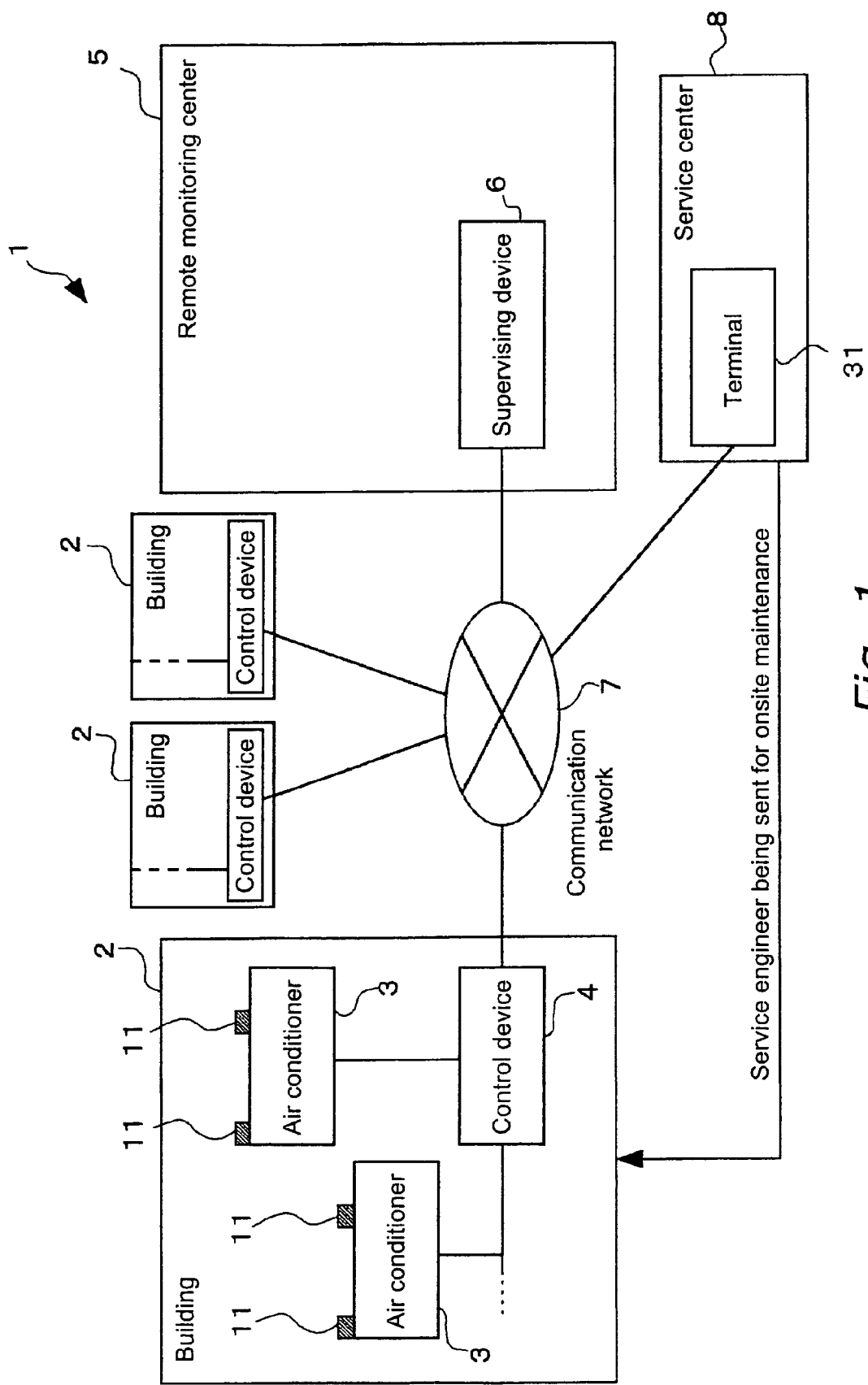
FIG. 1 is a diagram showing an outline of a control system of the air conditioner.

FIG. 1 shows a control system 1 of an air conditioner according to the maintenance-information providing system of the present invention. The control system 1 controls the air conditioner 3 that conditions air in a building 2 by a control device 4, as well as supervising the air conditioner 3 by a supervising device 6 set up in a remote monitoring center 5.

Additionally, the object to be supervised and controlled by the control system 1 should not be limited to the air conditioner 3 set up in the building 2 but may include other apparatuses such as hot-water supplying apparatus and lighting apparatus.

<General Structure>

The control system 1 is mainly comprised of an air conditioner 3, a control device 4 and a supervising device 6.

Plural air conditioners 3 are set up in the building 2 such as an office building or a factory for conditioning air in the interior. Each air conditioner 3 has plural sensors 11 that detect the state of operation or surroundings. The air conditioner 3 has a self-checking function, by which it can check whether its own operation state has any trouble or not, based on the result of detection of the sensors 11. If any trouble is identified in the air conditioner 3 (i.e. the apparatus is in an abnormal condition), the air conditioner 3 transmits a trouble code to the control device 4. The trouble code informs that the apparatus has trouble and indicates the type of trouble according to the code type.

The control device 4 is connected to the plural air conditioners 3 by communication wire in order to centrally control the respective air conditioners 3. The control device 4 is placed in a control room or the like of the building 2 where the air conditioners are placed. Further, the control device 4 receives trouble codes from the air conditioners 3. The control device 4 is connected to the supervising device 6 via a communication network 7 to transmit operation data and trouble codes of the respective air conditioners 3 to the supervising device 6.

The operation data include state-detected values which are detected by the sensors 11 of the air conditioner 3, controls performed in the air conditioner 3, power consumption of the air conditioner 3 or the like. The operation data are detected at predetermined intervals, for example, minutely and stored in the control device 4.

The control device 4 transmits the stored operation data and the trouble codes, which are received from the air conditioners at any time, all together to the supervising device 6, for example, every hour. Further, the control device 4 checks whether the air conditioner 3 has trouble or not and whether it is likely to have trouble or not, based on the operation data of the air conditioner 3, and then outputs predictive trouble codes. The control device 4 transmits the outputted predictive trouble codes to the supervising device 6, like the operation data and trouble codes.

The supervising device 6, which supervises plural air conditioners 3 connected to the control devices 4 placed in plural buildings 2, is located in a remote monitoring center 5 that is located remotely from the buildings 2 having air conditioners 3. Also, the supervising device 6 stores information of particulars which specify each of the air conditioners 3 (The particulars may include a model name, a product name, and an age of the air conditioner 3, a business type, an area where the air conditioner is located.) The particulars are transmitted from the control device 4 when the air conditioners 3 are first set up or are inputted by an operator of the supervising device 6, and are then stored in the supervising device 6.

The supervising device 6 serves to, for example, check troubles, automatically do energy-saving controls, and automatically write reports.

Checking troubles is carried out as follows. When checking troubles, the supervising device 6 checks whether the respective air conditioners 3 placed in the building 2 have troubles or are likely to have troubles, by making reference to the operation data, trouble codes and predictive trouble codes of the air conditioners 3 transmitted from the control device 4. In addition, when no predictive trouble codes are outputted from the control device 4, the supervising device 6 checks whether the air conditioners 3 are likely to have troubles based on the operation data of the air conditioners 3. As a result, if the supervising device 6 decides that any one of the air conditioners 3 is likely to have trouble, it outputs a predictive trouble code. The supervising device 6 notices a janitor or the like of the building 2 that the air conditioner 3 has trouble or is likely to have trouble after the decision. Further, the supervising device 6 extracts portions to be maintained and repaired (maintenance portions) based on the trouble codes and the predictive trouble codes and then transmit them to a terminal 31 in a service center 8. The information transmitted to the terminal 31 includes maintenance portions. After that, a service engineer who is assigned to the service center 8 is sent to the building 2 in order to maintain and repair the air conditioners 3 (including checking and repairing) based on that information.

Automatic energy-saving controls are carried out regularly so that a certain amount of power consumption can be reduced in a certain period.

Automatically writing reports is carried out in such a manner that reports summarizing the effect of performance of energy-saving controls are automatically written and sent regularly to an owner or a janitor of the building 2.

Among these functions of the supervising device 6, mainly the above-mentioned trouble-checking is described in the following.

<Structure of Supervising Device>

Figure 2:
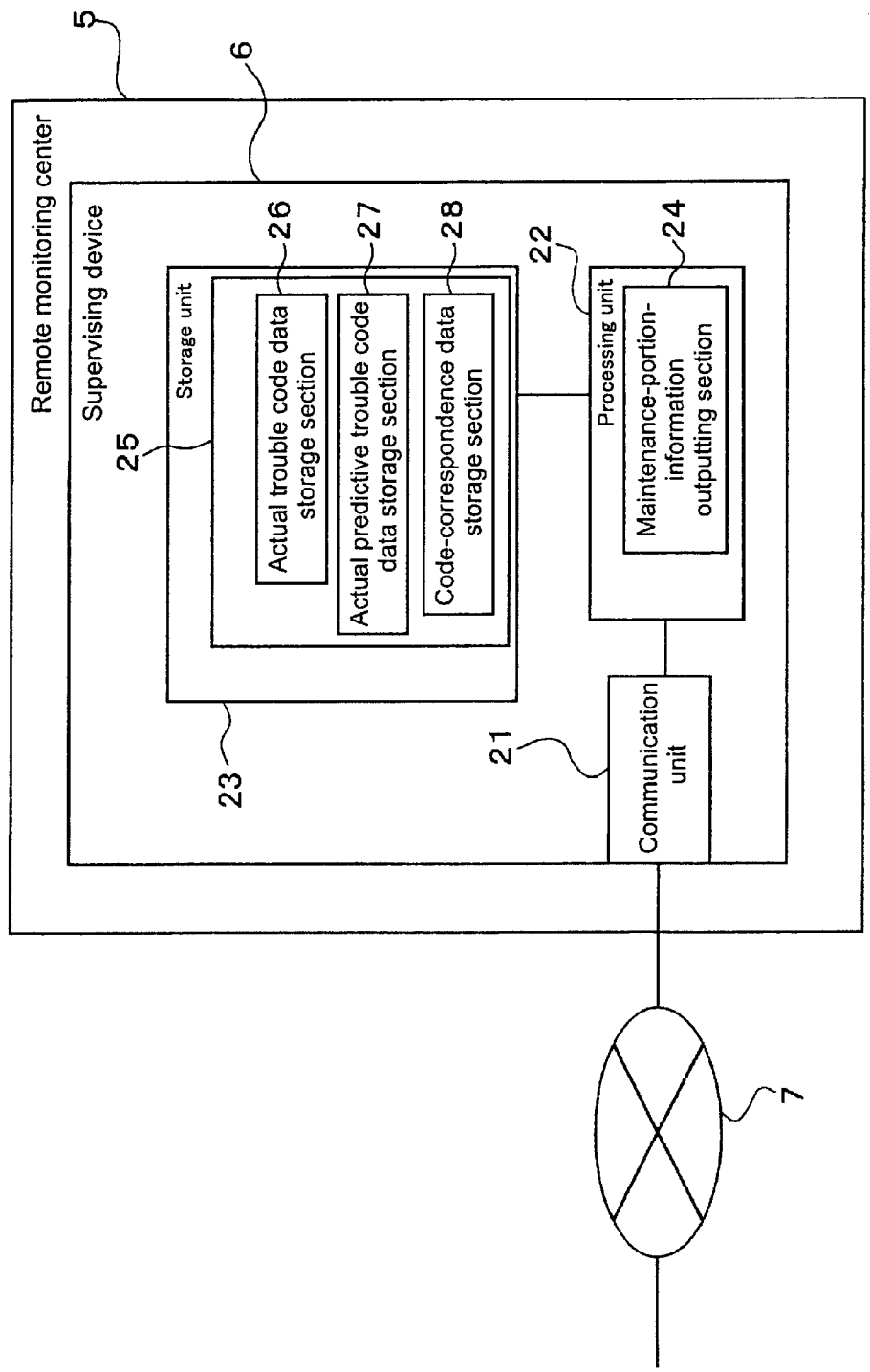
FIG. 2 is a block diagram of the supervising device of the control system of the air conditioner.

FIG. 2 shows part of the structure of the supervising device 6, which is related to the trouble-checking.

The supervising device 6 mainly has a communication unit 21, a processing unit 22 and a storage unit 23.

(Communication Unit)

The communication unit 21 receives operation data of the air conditioner 3, trouble codes and predictive trouble codes which are transmitted from the control device 4 via the communication network 7. The communication unit 21 also transmits steps for the automatic energy-saving control of the air conditioner 3 of the building 2, automatically-written reports or the like to the control devices 4. Furthermore, when the air conditioner 3 has trouble or is likely to have trouble, the communication unit 21 transmits information to the terminal 31 of the service center 8, ordering that a service engineer for onsite maintenance and repair of the air conditioner 3 should be sent. The communication unit 21 also transmits information that trouble is occurring/is likely to occur to the control device 4. Therefore, when the control device 4 has an alarming function, the users of the building 2 can be informed of occurrence of trouble in the air conditioner 3 using the alarming function. The means for transmitting information that the air conditioner 3 has trouble and is likely to have trouble should not be limited to the communication network 7. The information may be transmitted via fax or the like.

(Processing Unit)

The processing unit 22 has the storage unit 23 store the operation data of the air conditioner 3 received by the communication unit 21 and also checks troubles in the air conditioner 3 based on the operation data. The processing unit 22 also serves to, for example, compile steps for automatic energy-saving control and automatically write reports.

The processing unit 22 has a maintenance-portion-information outputting section 24. The maintenance-portion-information outputting section 24 extracts plural trouble portions of the air conditioner 3 from an actual data storage section 25 (included in the storage unit 23) that stores on the actual maintenance of the air conditioner 3 in the past, based on the trouble codes and predictive trouble codes with respect to the air conditioner 3. The maintenance-portion-information outputting section 24 then outputs the extracted trouble portions as maintenance portions. Furthermore, for each of the maintenance portions, a certainty degree is figured out based on a frequency of occurrence of the trouble portions under the trouble codes and predictive trouble codes extracted from the actual data storage section 25. The outputted maintenance portions are transmitted to the terminal 31 of the service center 8, together with their own certainty degrees, via the communication units 21.

In addition, even when the control device 4 outputs no predictive trouble codes, the maintenance-portion-information outputting section 24 double-checks whether the air conditioner 3 is likely to have trouble or not, based on the operation data of the air conditioner 3. As a result, if it is decided that the air conditioner 3 is likely to have trouble, the maintenance-portion-information outputting section 24 outputs a predictive trouble code and then performs in the same manner as mentioned above.

(Storage unit)

The storage unit 23 stores particulars of the air conditioners 3, operation data of the air conditioners 3 received via the communication unit 21, trouble codes and predictive trouble codes. Also, the storage unit 23 stores, for example, control information required for the control system 1.

Furthermore, the storage unit 23 includes the actual data storage section 25 that stores data on the actual maintenance of air conditioners 3 in the past. The actual data are those on actual trouble portions of the air conditioners 3 recorded when trouble codes and predictive trouble codes of the air conditioner 3 were outputted in the past. The actual data are inputted by the terminal 31 of the service center 8 or the like, based on the information (including trouble codes, predictive trouble codes, trouble portions of the air conditioner 3, or the particulars of the air conditioner 3) regarding onsite repairs which were carried out on the air conditioner 3 by service engineers.

The actual data storage section 25 comprises an actual trouble code data storage section 26 that stores the actual data when a trouble code is outputted, an actual predictive trouble code data storage section 27 that stores the actual data when a predictive trouble code is outputted, and a code-correspondence data storage section 28 that stores correspondence between a predictive trouble code and a trouble code when a trouble code is further outputted because a predictive trouble code was outputted but ignored so no maintenance has been carried out.

The actual trouble code data storage section 26 stores actual data having actual trouble portions recorded in the case where trouble codes of the air conditioner 3 were outputted in the past.

The actual predictive trouble code data storage section 27 stores actual data having actual trouble portions (including those likely to occur) recorded in the case where predictive trouble codes of the air conditioner 3 were outputted in the past.

The code-correspondence data storage section 28 stores data of correspondences between a trouble code outputted when a predictive trouble code of the air conditioner 3 was outputted but no maintenance was carried out in the past and that predictive trouble code. Among the actual data, those in the case where repair has been done with respect to a trouble code outputted when a predictive trouble code was outputted but ignored with no maintenance carried out are not recorded in the actual predictive trouble code data storage section 27 but recorded in the actual trouble code data storage section 26 instead.

<Steps for Checking Troubles>

Figure 3A:
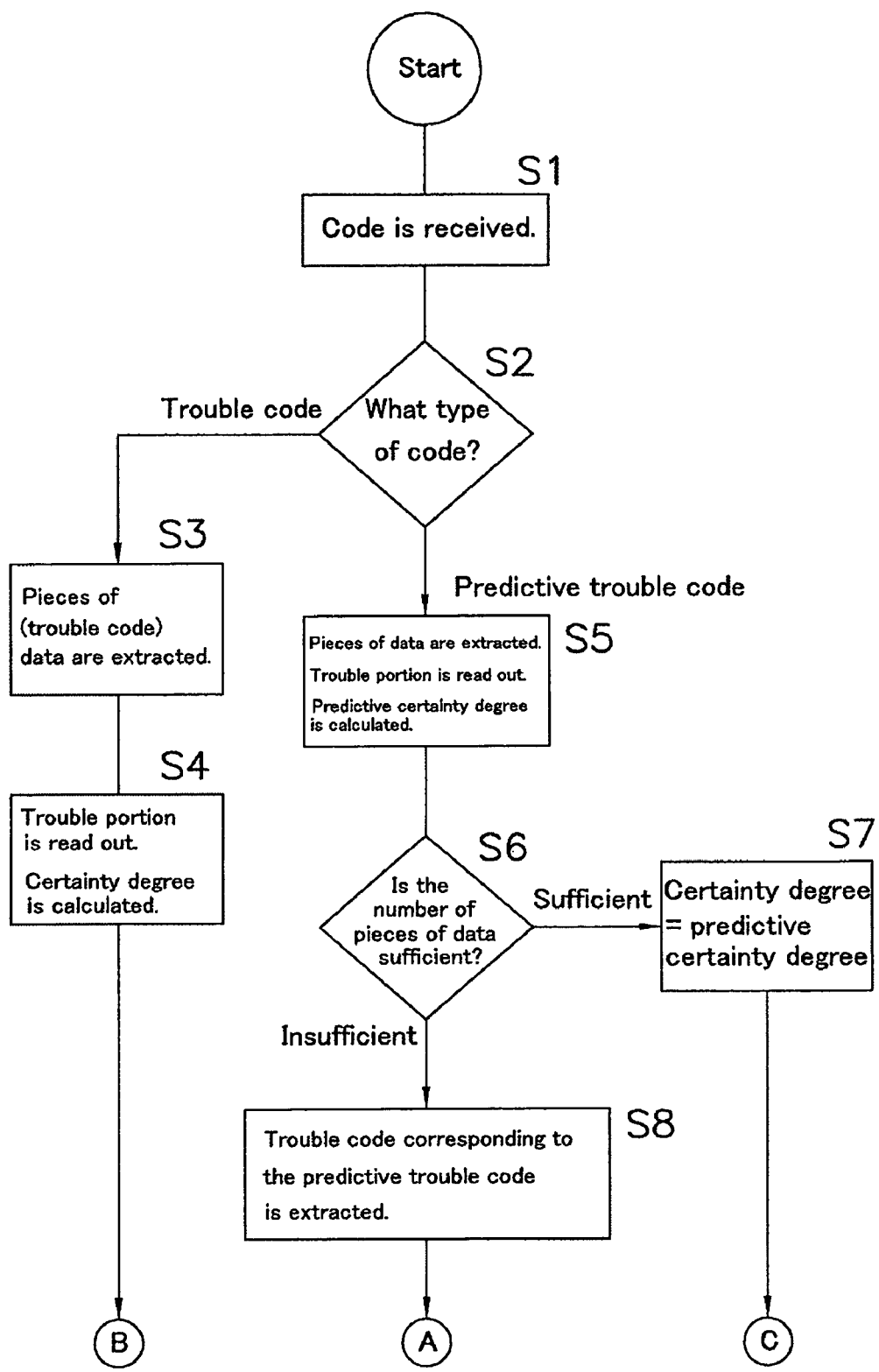
FIG. 3(A) is a flow chart showing (the first half) steps for checking troubles in the air conditioner.
Figure 3B:
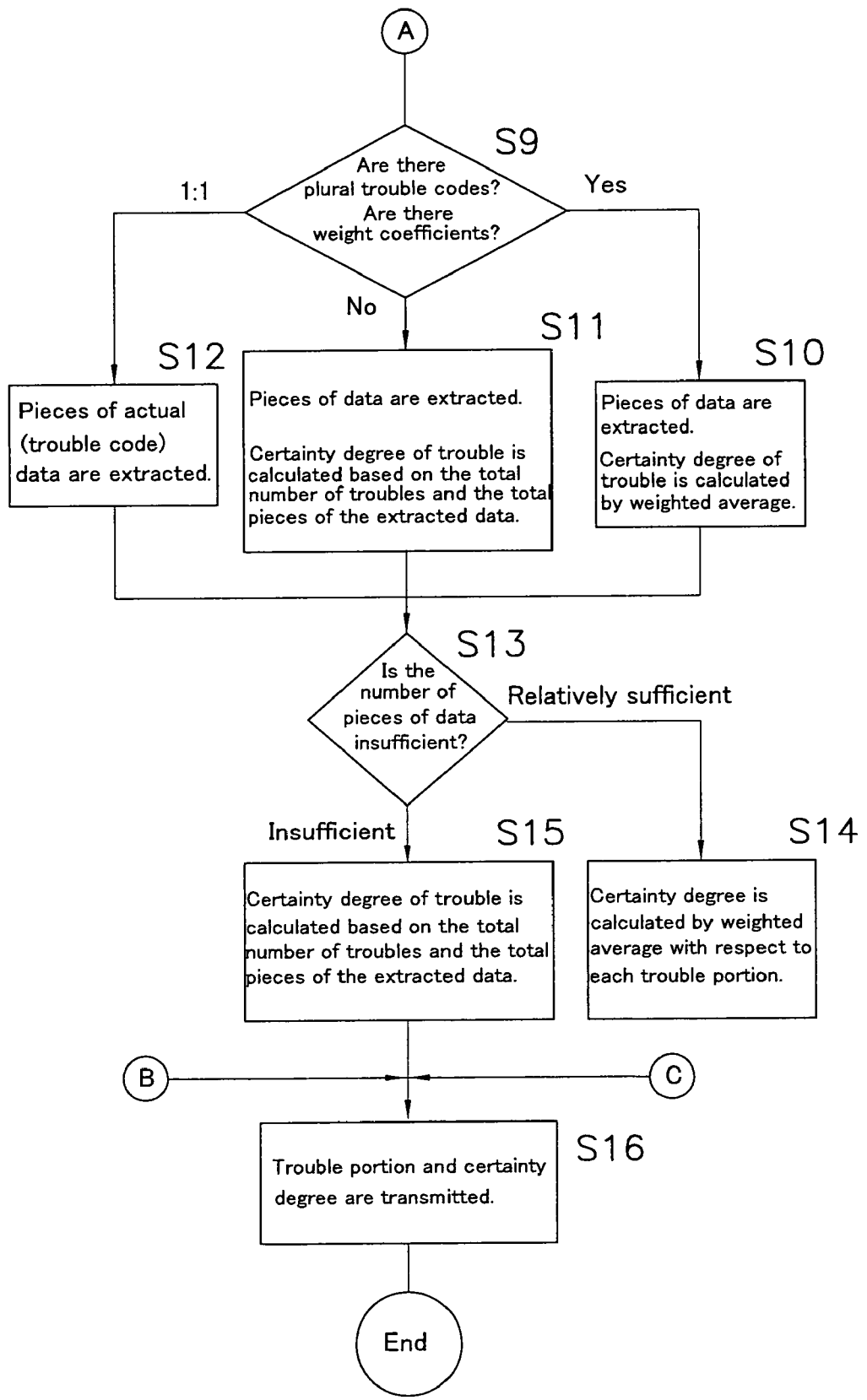
FIG. 3(B) is a flow chart showing (the second half) steps for checking troubles in the air conditioner.

In the following, steps for checking troubles of the air conditioner 3 by the supervising device 6 are described in accordance with a flow of the operation carried out by the maintenance-portion-information outputting section 24 of the processing unit 22 as shown in FIG. 3(A) and FIG. 3(B). The number of pieces of actual data which can be considered to be sufficiently stored varies with the trouble code/predictive trouble code. Therefore, the numbers described below are one example. Furthermore, if the number of pieces of actual data stored in and extracted from the actual trouble code data storage section 26 and the actual predictive trouble code data storage section 27 is not sufficient, the processing unit 22 further checks and sees if there is any trouble in accordance with empirical rules which have been used. Additionally, the methods for checking troubles may be optionally selected.

First, in step S1, the communication unit 21 receives a trouble code or a predictive trouble code. Step S1 includes a case that the maintenance-portion-information outputting section 24 outputs a predictive trouble code based on the operation data of the air conditioner 3.

Next, in step S2, the received code is distinguished into a trouble code or a predictive trouble code. If it is a trouble code, then the procedure goes to step S3. If it is a predictive trouble code, then the procedure goes to step S5.

In step S3, the data which correspond to the trouble code received in step S1 are extracted from the actual trouble code data storage section 26. The extracted data are limited to, among those stored in the actual trouble code data storage section 26, the actual data relating to the particulars of the air conditioner 3 for which the trouble code received in step 1 is outputted. After the data extraction, the procedure goes to step S4.

In step S4, trouble portions corresponding to the extracted data in step S3 are led out and certainty degrees with respect to the respective trouble portions are figured out. The certainty degree here means a frequency of occurrence of each trouble portion corresponding to a trouble code. A certainty degree with respect to a trouble portion is calculated by dividing the frequency of troubles in the trouble portion among the extracted data by the total pieces of the extracted data. After the certainty degree is figured out, the procedure goes to step S16.

FIG. 4(A) shows trouble portions extracted in the trouble code 1 and certainty degrees with respect to the respective trouble portions. The total pieces of the data extracted in the trouble code 1 amount to 50. The frequency of troubles occurred in the electric valve is 20, so in step S4, the calculation is to be 20/50=0.4, which is a certainty degree that the electric valve is a trouble portion under the trouble code 1.

In step S5, the data which correspond to the predictive trouble code received in step S1 are extracted from the actual predictive trouble code data storage section 27, from which the trouble portions are extracted. Then predictive certainty degrees with respect to the respective trouble portions are figured out. The predictive certainty degree here means a frequency of occurrence of each trouble portion corresponding to a predictive trouble code. The data to be extracted are limited to, among the actual data stored in the actual predictive trouble code data storage section 27, the actual data relating to the particulars of the air conditioner 3 for which the trouble code received in step S1 is outputted. After the data extraction, the procedure goes to step S6.

In step S5, the predictive certainty degree with respect to the trouble portion is calculated by dividing a frequency of troubles in each of the trouble portions among the extracted data by the total pieces of the extracted data. FIG. 4(B) show the extracted data under the predictive trouble code A. Three examples which vary by the number of the extracted pieces of data are shown. FIG. 4(B) I shows the case where the number of the extracted pieces of data is insufficient, II shows the case where the number is relatively sufficient, and III shows the case where the number is sufficient.

In step S6, it is decided whether the number of the extracted pieces of data in step S5 is sufficient or not. As described above, it depends on the predictive trouble code whether the number of pieces of data is considered to be sufficient. In FIG. 4(B) III, it is set that the sufficient number of the extracted pieces of data is 100. If the number is sufficient, the procedure goes to step S7. If not, the procedure goes to step S8.

In step S7, the predictive certainty degrees with respect to the trouble portions figured out in step S5 are set to be certainty degrees. The following is an example of the case in FIG. 4(B) III in which the number of the extracted pieces of data is sufficient. Here the total number of the extracted pieces of data under the predictive trouble code A is 100. The frequency of troubles in the compressor is 60. Therefore, the certainty degree with respect to the compressor under the predictive trouble code A is figured out to be 60/100=0.6. After step S7, the procedure goes to step S16.

In step S8, a trouble code corresponding to the predictive trouble code is extracted from the code-correspondence data storage section 28. A single predictive trouble code may correspond to plural trouble codes. In FIG. 4(C) show an example in which the predictive trouble code A corresponds to a trouble code 1 and a trouble code 2. After the extraction in step S8, the procedure goes to step S9.

In step S9, it is decided whether there are plural extracted trouble codes that correspond to the predictive trouble code and whether the predictive trouble code has weight coefficients with respect to the plural trouble codes. If they have weight coefficients, the procedure goes to step S10. If not, the procedure goes to step S11. Additionally, if there is only one trouble code corresponding to the predictive trouble code (i.e. a single trouble code corresponds to a single predictive trouble code), the procedure goes to step S12.

In step S10, the data corresponding to the trouble code extracted as those corresponding to the predictive trouble code are extracted from the actual trouble code data storage section 26. Then, the trouble portions are extracted and the certainty degrees with respect to trouble portions are figured out respectively. After that, the procedure goes to step S13.

In step S10, the calculated certainty degree of trouble means a frequency of occurrence of each trouble portion. In step S10, the extracted data are limited to, among those stored in the actual trouble code data storage section 26, the actual data relating to the particulars of the air conditioner 3 for which the predictive trouble code is outputted.

In step S10, a certainty degree with respect to the trouble portion is calculated by taking a weighted average of the frequencies of the trouble portions in the extracted data. FIG. 4(D) shows an example in which the trouble codes 1 and 2 correspond to the predictive trouble code A and the ratio of the weight coefficients of the trouble codes 1 and 2 is 1:2. In the following, for example, the certainty degree of trouble in the electric valve will be figured out. The frequency of trouble occurrence in the electric valve under the trouble code 1 is 20/50 (=0.4). The frequency of trouble occurrence in the electric valve under the trouble code 2 is 2/10 (=0.2). Then, by taking a weighted average of them, the certainty degree of trouble in the electric valve can be figured out as follows:

$$\text{Certainty degree of trouble} = 1/(1+2) \times [1 \times (20/50) + 2 \times (2/10)]$$
$$= 1/3 \times 40/50$$
$$= 40/150$$
$$\approx 0.267$$

The certainty degrees of troubles in the electromagnetic valve, compressor and so on can be calculated in the same manner.

In step S11, the data corresponding to the trouble code extracted as the one corresponding to the predictive trouble code are extracted from the actual trouble code data storage section 26. Then, the trouble portions are extracted and the certainty degrees with respect to the trouble portions are figured out respectively. After that, the procedure goes to step S13.

In this step S11, the extracted data are limited to, among those stored in the actual trouble code data storage section 26, the actual data relating to the particulars of the air conditioner 3 for which the predictive trouble code is outputted.

Furthermore, in step S11, a certainty degree of trouble in the trouble portion is calculated by dividing the total number of troubles in each of the trouble portions in the extracted data by the total extracted pieces of data under the trouble code. FIG. 4(E) shows an example in which the trouble codes 1 and 2 correspond to the predictive trouble code A and the trouble codes 1 and 2 do not have weight coefficients. In the following, for example, the certainty degree of trouble in the electric valve is figured out. The number of troubles having occurred in the electric valve under the trouble code 1 is 20. The number of troubles having occurred in the electric valve under the trouble code 2 is 2. Therefore, the total number of the troubles having occurred in the electric valve under the predictive trouble code A is 20+2=22. Further, the total number of the extracted pieces of data for the trouble code is 50+10=60. From this, the certainty degree of trouble in the electric valve can be figured out as follows:

$$\text{Certainty degree of trouble} = 22/60$$
$$\approx 0.367$$

The certainty degrees of troubles in the electromagnetic valve, compressor and so on can be calculated in the same manner.

In step S12, the data corresponding to the trouble code which has one-to-one correspondence to the predictive trouble code are extracted from the actual trouble code data storage section 26. Then, the trouble portions are extracted and the certainty degrees with respect to the trouble portions are figured out. After that, the procedure goes to step S13.

In this step S12, the extracted data are limited to, among those stored in the actual trouble code data storage section 26, the actual data relating to the particulars of the air conditioner 3 for which the trouble code having a one-to-one correspondence to the predictive trouble code is outputted.

Furthermore, in step S12, the certainty degree of trouble in the trouble portion is calculated by dividing the number of troubles in each of the trouble portions in the extracted data by the total extracted pieces of data. FIG. 4(C) I shows an example in which the trouble code 1 has a one-to-one correspondence to the predictive trouble code A. Here, the certainty degree of trouble in the electric valve is 20/50(=0.4). The certainty degrees of troubles in the electromagnetic valve, heat exchanger and so on can be calculated in the same manner.

In step 13, it is decided whether the number of pieces of data (extracted in step S5) corresponding to the predictive trouble code is insufficient or relatively sufficient. The evaluation for the number of pieces of data varies depending on the predictive trouble codes. In FIG. 4(B), it is decided to be relatively sufficient if the number of extracted pieces of data is 50, while it is decided to be insufficient if the number of extracted pieces of data is 20. When the number of pieces of data is relatively sufficient, the procedure goes to step S14. When the number of pieces of data is insufficient, the procedure goes to step S15.

In step S14, a certainty degree of each trouble portion is calculated from the predictive certainty degree of the trouble portion figured out in step S5 and the certainty degree of the trouble portion figured out in one of steps S10 through 12. After the certainty degree is figured out, the procedure goes to step S16.

In step S14, the certainty degree of the trouble portion is calculated by taking a weighted average of the predictive certainty degree and the certainty degree with respect to the trouble portion based on the degree of contribution of the predictive trouble code and the trouble code. The certainty degree with respect to the electric valve will now be described by taking an example of FIG. 4(F). FIG. 4(F) shows the case where the ratio of contribution of the predictive trouble code and the trouble code is 2:1. The predictive certainty degree with respect to the electric valve under the predictive trouble code is 20/50 (see FIG. 4(B) II). The certainty degree of trouble in the electric valve under the trouble code figured out in step S10 is 40/150 (see FIG. 4(D)). Therefore, the certainty degree with respect to the electric valve can be calculated by taking a weighted average of them as follows:

$$\text{Certainty degree} = 1/(2+1) \times [2 \times (20/50) + 1 \times (40/150)]$$
$$= 1/3 \times (120+40)/150$$
$$= 160/150$$
$$\approx 0.356$$

The certainty degree with respect to the compressor, heat exchanger and so on can be calculated in the same manner.

In step S115, the certainty degree in each of the trouble portions is calculated from the predictive certainty degree with respect to the trouble portion figured out in step S5 and the certainty degree with respect to the trouble portion figured out in any one of steps S10 through S12. After the certainty degree is figured out, the procedure goes to step S16.

In step S15, the certainty degree with respect to the trouble portion is calculated by dividing the total number of troubles having occurred in the trouble portion by the total number of pieces of data in the predictive certainty degree and the certainty degree with respect to the trouble portion. The certainty degree with respect to the electric valve will now be described by taking an example of FIG. 4(G). The predictive certainty degree with respect to the electric valve under the predictive trouble code is 6/20 (see FIG. 4(B) I). The certainty degree of trouble in the electric valve under the trouble code figured out in step S10 is 40/150(see FIG. 4(D)). Therefore, the number of troubles having occurred in the electric valve is 6+40=46, and the total number of pieces of data under the predictive trouble code and the trouble code is 20+150=170. From these, the certainty degree with respect to the electric valve can be figured out as follows:

Certainty degree=46/170

≈0.271

The certainty degrees in the compressor, heat exchanger and so on can be calculated in the same manner.

In step 16, the trouble portions extracted in step S3 or S5 and step S8, as well as the corresponding certainty degrees with respect to the trouble portions figured out in step S4, S7, S14 or S15, are outputted in descending order of the certainty degrees and are then transmitted to the terminal 31 of the service center 8 from the communication unit 21. In this case, the trouble portions are considered to be maintenance portions.

The maintenance portions and the certainty degrees transmitted in the above-described steps are displayed on the terminal 31 of the service center 8, for example, as shown in FIGS. 5(A) and 5(B). FIG. 5(A) is a diagram having an enlarged upper half of the display. FIG. 5(B) is a diagram having an enlarged lower half of the display. In the display shown in FIGS. 5(A) and 5(B), maintenance portions of the air conditioner 3 (Model name: ConveniPack ZEAS-AC, Operation time: 18765h, Business type: Other store-restaurant) for which a trouble code EO is outputted are outputted in the output information in descending order of the certainty degrees. When the operation time is checked in the "focused information", the actual data in which the product information is "Multi for Building" and the operation time is around 18765 hours can be extracted and outputted from the actual data in the past one year. Based on the outputted information, the service engineer assigned to the service center 8 is dispatched to the building 2 in order to repair the air conditioner 3.

<Characteristics>

(1)

In the control system 1 of the air conditioner according to the maintenance-information providing system of the present invention, when a trouble code is outputted because of the air conditioner 3 having trouble, the maintenance-portion-information outputting section 24 of the processing unit 22 of the supervising device 6 extracts a trouble portion which corresponds to the trouble code from the actual trouble code data storage section 26 of the actual data storage section 25 and then outputs the trouble portion as a maintenance portion of the air conditioner 3.

The maintenance-portion-information outputting section 24 is capable of figuring out a maintenance portion from the trouble code, based on the actual data stored in the actual trouble code data storage section 26. The actual data records the actual trouble portions of the air conditioner 3 identified when the trouble code was outputted in the past. Therefore, it is possible to output a maintenance portion by presuming a trouble portion of the air conditioner 3 for which the trouble code is outputted this time, based on the actual records made when the trouble code was outputted in the past. As a result, the outputted maintenance portion can be maintained, which makes it possible to carry out the maintenance of the air conditioner 3 quickly and accurately.

(2)

In the control system 1 of the air conditioner according to the maintenance-information providing system of the present invention, when a predictive trouble code is outputted while the air conditioner 3 is likely to have trouble, the maintenance-portion-information outputting section 24 extracts a trouble portion which corresponds to the predictive trouble code from the actual predictive trouble code data storage section 27 of the actual data storage section 25 and then outputs the trouble portion as a maintenance portion of the air conditioner 3.

The maintenance-portion-information outputting section 24 can figure out the maintenance portion from the predictive trouble code, based on the actual data stored in the actual predictive trouble code data storage section 27. The actual data storage section 25 records the actual trouble portions (including the portions likely to have troubles) of the air conditioner 3 identified when the predictive trouble code was outputted in the past in the same way as the trouble code was. Therefore, it is possible to output a maintenance portion by presuming a trouble portion of the air conditioner 3 for which the predictive trouble code is outputted this time, based on the actual records made when the predictive trouble code was outputted in the past.

(3)

In the control system 1 of the air conditioner according to the maintenance-information providing system of the present invention, when a predictive trouble code is outputted while the air conditioner 3 is likely to have trouble, the maintenance-portion-information outputting section 24 extracts a trouble code which is presumed to be outputted when the outputted predictive trouble code is ignored without any repair, based on the code-correspondence data storage section 28 of the actual data storage section 25. Then, the maintenance-portion-information outputting section 24 extracts a trouble portion corresponding to the extracted trouble code from the actual trouble code data storage section 26 of the actual data storage section 25 and then outputs it as a maintenance portion of the air conditioner 3.

The actual predictive trouble code data storage section 27 stores only the data relating to a trouble portion that was identified during the maintenance for a predicted trouble.

Then, the maintenance-portion-information outputting section 24 extracts a trouble portion corresponding to the predictive trouble code from the actual predictive trouble code data storage section 27 and then outputs it as a maintenance portion of the air conditioner 3. At the same time, the maintenance-portion-information outputting section 24 extracts a trouble code corresponding to the predictive trouble code based on the code-correspondence data storage section 28. The maintenance-portion-information outputting section 24 then extracts a trouble portion corresponding to the extracted trouble code from the actual trouble code data storage section 26 and then outputs it as a maintenance portion. Therefore, it becomes possible to output a maintenance portion based on a greater number of pieces of actual data. By maintaining the outputted maintenance portion, the air conditioner 3 can be maintained quickly and accurately.

(4)

In the control system 1 of the air conditioner according to the maintenance-information providing system of the present invention, the maintenance-portion-information outputting section 24 outputs maintenance portions and certainty degrees in descending order of the certainty degrees. The certainty degrees are calculated based on frequencies of trouble portions under the trouble codes and predictive trouble codes extracted from the actual data storage section 25. If the certainty degree is high, the corresponding maintenance portion can be considered, from the past experience, to be the one that should be maintained and repaired (should be confirmed) preferentially with respect to the trouble codes and predictive trouble codes outputted from the air conditioner 3 this time. Therefore, it is possible to do efficient maintenance work by carrying out maintenance and repair in accordance with the certainty degrees.

(5)

In the control system 1 of the air conditioner according to the maintenance-information providing system of the present invention, the maintenance-portion-information outputting section 24 limits the scope of extraction from the actual data storage section 25, based on the particulars of the air conditioner 3. The particulars include, for example, information of a model name, a product name, an age of the air conditioner 3 since the air conditioner was set up, a business type and an area where the air conditioner is located. By limiting the actual data included in the actual data storage section 25 by these particulars, it is possible to extract a maintenance portion by, among the past actual data, targeting the actual data similar to those of the air conditioner 3 for which the trouble code and predictive trouble code are outputted this time. In other words, the maintenance-portion-information outputting section 24 is capable of extracting a maintenance portion suitable for each air conditioner 3 in view of a model of the air conditioner 3, a tendency due to time-based changes, a tendency of change due to its operational conditions according to the location and the business type or the like. As a result, by thus limiting with the particulars, more proper maintenance and repair can be carried out.

Other Embodiments of the Invention (1)

In the control system 1 of the air conditioner according to the maintenance-information providing system of the present invention, the maintenance-portion-information outputting section 24 of the processing unit 22 of the supervising device 6 outputs maintenance portions and the corresponding certainty degrees in descending order of the certainty degrees from the trouble codes and predictive trouble codes based on the actual data of the actual data storage section 25. Then the terminal 31 of the service center 8 displays them, for example, as shown in FIGS. 5(A) and (B).

If the maintenance-portion-information outputting section 24 further can output articles required for the maintenance portions, the service engineers of the service center 8 can carry out onsite maintenance and repair more properly and easily. Furthermore, since it becomes possible for service engineers of the service center 8 to go to the buildings 2 for maintenance and repair bringing the required articles with them, it is possible for them to check the trouble portions and do maintenance and repair at one time. As a result, the number of visits to the buildings 2 by service engineers can be reduced, so that the air conditioner 3 can be maintained and repaired quickly. Further, the period that the air conditioner 3 has trouble and is likely to have trouble can be reduced.

(2)

In the control system 1 of the air conditioner according to the maintenance-information providing system of the present invention, when a trouble code or a predictive trouble code of the air conditioner 3 is outputted, the maintenance-portion-information outputting section 24 of the processing unit 22 of the supervising device 6 limits the actual data of the actual data storage section 25 by the particulars and then extracts a trouble portion corresponding to the trouble code or the predictive trouble code based on the limited actual data. The maintenance-portion-information outputting section 24 then outputs the trouble portion to the terminal 31 of the service center 8 and so on.

Alternatively, this can be performed as follows. When the terminal 31 of the service center 8 is displaying (outputting) maintenance portions and the corresponding certainty degrees, the maintenance-portion-information outputting section 24 limits the actual data of the actual data storage section 25 again by the particulars such as a model name and a business type being selectively inputted and then transmitted into the communication unit 21 of the supervising device 6 via the communication network 7. Then, the maintenance-portion-information outputting section 24 extracts trouble portions corresponding to the trouble code and predictive trouble code based on the limited actual data, which are outputted to, for example, the terminal 31 of the service center 8 as maintenance portions.

With such operation, even if the supervising device 6 does not store any particulars (for example, the age) but the service center 8 knows the particulars of the air conditioner 3, it is possible to limit the actual data by the particulars. Furthermore, if it is preferable to change the particulars into more suitable ones, it is possible to correct them at the terminal 31. With this, it is possible to output maintenance portions and the corresponding certainty degrees more appropriately.

When the number of pieces of actual data to satisfy the inputted particulars is insufficient, the scope for limitation with respect to the inputted particulars may be enlarged so that a certain number of pieces of the actual data can be obtained. For example, as shown in FIGS. 5(A) and (B), the operation time of the air conditioner 3 is 18765 hours. Normally, in this case, the result information to be outputted would be based on the actual data of the air conditioners 3 with particulars having an operation time of around 18765 hours. However, if there are only few pieces of actual data that meet the particulars, the scope of the operation time can be extended to, for example, around 15000 through 20000 hours.

As a further example, when an air conditioner located in Aomori Prefecture is the target, there may be only few pieces of actual data for the air conditioners 3 located in Aomori Prefecture. In this case, the scope can be extended to the actual data of the air conditioners 3 located, for example, in the Northeast district. Alternatively, the scope can be extended to the actual data of the air conditioners 3 located in the areas having similar climates to that of Aomori Prefecture (such as the southern part of Hokkaido, Aomori, Akita and Iwate Prefectures).

By thus changing the scope of limitation, it is possible to obtain a sufficient number of pieces of actual data.

(3)

In the control system 1 of the air conditioner according to the maintenance-information providing system of the present invention, the particulars of the air conditioner 3 includes an age of the air conditioner 3 since the air conditioner was set up. From the age, a tendency due to time-based changes can be recognized.

If the operation data of the air conditioner 3 can include operation time, the scope of extraction from the actual data storage section 25 can be limited by the operation time as one of the particulars, instead of the age. With the age, non-operation time after the air conditioner 3 was set up can not be taken into account. Based on the operation time, however, it is possible to take account of a period in which time-based changes occur more appropriately. Therefore, it is possible to limit the actual data more appropriately.

INDUSTRIAL APPLICABILITY

With the maintenance-information providing system according to the present invention, trouble portions can be extracted from the predictive trouble data of the apparatus. The trouble portions can be information for onsite maintenance on the apparatus. Therefore, it is possible to carry out the maintenance of the apparatus more appropriately.

What is claimed is:

1. A maintenance-information providing system for providing maintenance information of an apparatus, comprising:
    a storage unit configured to store storage data including trouble data of the apparatus and predictive trouble data of the apparatus, the storage unit including
        an actual trouble data storage section configured to store correspondence between the trouble data and the trouble portion in the apparatus that has previously occurred,
        an actual predictive trouble data storage section configured to store correspondence between the predictive trouble data and the trouble portion in the apparatus that has previously occurred, and
        a corresponding data storage section configured to store the trouble data corresponding to the predictive trouble data; and
    a processing unit configured to extract a trouble portion of the apparatus corresponding to the predictive trouble data, based on the storage data of the storage unit, and to extract the trouble data corresponding to the predictive trouble data from the corresponding data storage section and then extracts the trouble portion of the apparatus corresponding to the trouble data.

2. The maintenance-information providing system according to claim 1, wherein
    the processing unit is further configured to extract the trouble portion of the apparatus corresponding to the trouble data from the actual trouble data storage section.

3. The maintenance-information providing system according to claim 1, wherein
    the processing unit is further configured to output the trouble portion that was extracted as a maintenance portion.

4. The maintenance-information providing system according to claim 1, wherein
    the processing unit is further configured to output information on an article used for maintenance of the apparatus.

5. The maintenance-information providing system according to claim 1, wherein
    the processing unit is further configured to extract a plurality of the trouble portions,
    the processing unit is further configured to calculate a frequency of each of the trouble portions, which are extracted from the actual predictive trouble data storage section and the actual trouble data storage section, and
    the processing unit is further configured to output the trouble portion with certainty degrees in descending order of the certainty degrees.

6. The maintenance-information providing system according to claim 1, further comprising
    a communication unit configured to receive the trouble data, the predictive trouble data and selected particulars of the apparatus including at least data indicative of a model of the apparatus, wherein
    the processing unit is further configured to limit extraction of the trouble portion which meets the particulars.

7. The maintenance-information providing system according to claim 6, wherein
    the particulars further include data indicative of an age of the apparatus.

8. The maintenance-information providing system according to claim 6, wherein
    the particulars further include data indicative of a business type, and data indicative of an area where the apparatus is located.

9. The maintenance-information providing system according to claim 7, wherein
    the particulars further include data indicative of a business type, and data indicative of an area where the apparatus is located.

* * * * *

UNITED STATES PATENT AND TRADEMARK OFFICE
CERTIFICATE OF CORRECTION

PATENT NO. : 7,599,816 B2
APPLICATION NO. : 10/547380
DATED : October 6, 2009
INVENTOR(S) : Gen Kumamoto Page 1 of 1

It is certified that error appears in the above-identified patent and that said Letters Patent is hereby corrected as shown below:

Column 18,
Line 14, "trouble portion with certainty degrees in descending" should read -- trouble portions with certainty degrees in descending --.

Signed and Sealed this

Twenty-fourth Day of November, 2009

David J. Kappos
*Director of the United States Patent and Trademark Office*